US011347782B2

(12) United States Patent
Huang et al.

(10) Patent No.: US 11,347,782 B2
(45) Date of Patent: May 31, 2022

(54) INTERNET TEXT MINING-BASED METHOD AND APPARATUS FOR JUDGING VALIDITY OF POINT OF INTEREST

(71) Applicant: Baidu Online Network Technology (Beijing) Co., Ltd., Beijing (CN)

(72) Inventors: Jizhou Huang, Beijing (CN); Yaming Sun, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 343 days.

(21) Appl. No.: 16/508,257

(22) Filed: Jul. 10, 2019

(65) Prior Publication Data

US 2020/0081908 A1  Mar. 12, 2020

(30) Foreign Application Priority Data

Sep. 10, 2018 (CN) .......................... 201811053052.X

(51) Int. Cl.
*G06F 16/00* (2019.01)
*G06F 16/33* (2019.01)
(Continued)

(52) U.S. Cl.
CPC ...... *G06F 16/3344* (2019.01); *G06F 16/2365* (2019.01); *G06F 40/247* (2020.01);
(Continued)

(58) Field of Classification Search
CPC ............. G06F 16/3344; G06F 16/2365; G06F 40/247; G06F 40/30; G06F 2216/03; G06N 20/00
See application file for complete search history.

(56) References Cited

U.S. PATENT DOCUMENTS 8,521,539 B1 * 8/2013 Teng ........................ G10L 15/30
704/275
8,589,069 B1 * 11/2013 Lehman ................ H04W 4/029
701/438
(Continued)

FOREIGN PATENT DOCUMENTS

CN 105468679 A 4/2016
CN 106844571 A 6/2017
(Continued)

OTHER PUBLICATIONS

Rae et al. (2012) "Mining the Web for Points of Interest," SIGIR'12, Aug. 12-16, 2012, Portland, Oregon, USA, 10 pp.
(Continued)

*Primary Examiner* — Leslie Wong
(74) *Attorney, Agent, or Firm* — Lathrop GPM LLP

(57) ABSTRACT

Embodiments of the present disclosure disclose an Internet text mining-based method and apparatus for judging the validity of a point of interest. An implementation of the method includes: determining a search word set for indicating a to-be-detected point of interest; performing a search by using a determined search word as a search keyword, to obtain a description information set for describing the to-be-detected point of interest; and inputting a name of the to-be-detected point of interest and description information in the description information set into a pre-established validity discriminant model, to obtain a status label for indicating validity of the to-be-detected point of interest. This implementation enables timely discovery of invalid POI information. Thus, more accurate information are provided for users, user needs are met, and user experience is improved.

17 Claims, 8 Drawing Sheets

(51) Int. Cl.
  *G06N 20/00* (2019.01)
  *G06F 16/23* (2019.01)
  *G06F 40/247* (2020.01)
  *G06F 40/30* (2020.01)
(52) U.S. Cl.
  CPC .............. *G06F 40/30* (2020.01); *G06N 20/00* (2019.01); *G06F 2216/03* (2013.01)

(56) References Cited

U.S. PATENT DOCUMENTS

| | | | |
|---|---|---|---|
| 2010/0179754 A1 | 7/2010 | Faenger et al. | |
| 2013/0166196 A1* | 6/2013 | Narasimha | G01C 21/3682 701/426 |
| 2014/0006408 A1* | 1/2014 | Rae | G06F 40/295 707/740 |
| 2016/0073229 A1* | 3/2016 | Haro | H04W 4/021 455/456.3 |
| 2016/0147826 A1* | 5/2016 | Mishra | G01C 21/32 707/736 |
| 2021/0207974 A1* | 7/2021 | Zhou | G01C 21/206 |

FOREIGN PATENT DOCUMENTS

| | | |
|---|---|---|
| CN | 107784125 A | 3/2018 |
| JP | 2010164688 A | 7/2010 |
| JP | 4957796 B2 | 6/2012 |
| WO | WO2008142791 A1 | 11/2008 |

OTHER PUBLICATIONS

Chuang et al. (2018) "Detecting outdated POI relations via web-derived features," Transactions in GIS, vol. 22, pp. 1238-1256.

Chuang et al. (2015) "Verification of POI and Location Pairs via Weakly Labeled Web Data," WWW 2015 Companion, May 18-22, 2015, Florence, Italy, ACM 978-1-4503-3473-0/15/05, 6 pp.

Feng et al., Text sentiment analysis based on convolutional neural networks and attention model, Application Research of Computers, vol. 35 No. 5, May 2018, 1434-1436, 3 pp.

* cited by examiner

INTERNET TEXT MINING-BASED METHOD AND APPARATUS FOR JUDGING VALIDITY OF POINT OF INTEREST

CROSS-REFERENCE TO RELATED APPLICATIONS

This application claims priority to Chinese Patent Application No. 201811053052.X, filed with the China National Intellectual Property Administration (CNIPA) on Sep. 10, 2018, the content of which is incorporated herein by reference in its entirety.

TECHNICAL FIELD

Embodiments of the present disclosure relate to the field of Internet, specifically to the field of Internet text mining, and more particularly to an internet text mining-based method and apparatus for judging the validity of a point of interest.

BACKGROUND

A POI (Point of Interest) is any non-geographically meaningful point on a map, such as a shop, a hospital, a gas station, a station, or a restaurant. Each POI may include a variety of information, such as name, category, or coordinates. For example, the category of the POI may include food, hotel, shopping, or life service. Each category may also include a variety of subcategories. For example, the category of "food" may also include sub-categories such as Chinese restaurant, foreign restaurant, snack bar, cake and dessert shop, cafe, teahouse, and bar.

At present, in map products (e.g., map applications, navigation applications, etc.), the discovery of invalid POIs mainly depends on user feedback. For example, when a user arrives at a POI location by using a navigation application, and discovers that the POI has been relocated, the user may operate in the navigation application to feed the information indicating invalidity of the POI back to a server providing the navigation service.

SUMMARY

Embodiments of the present disclosure propose an Internet text mining-based method and apparatus for judging the validity of a point of interest.

In a first aspect, the embodiments of the present disclosure provide an Internet text mining-based method for judging the validity of a point of interest, including: determining a search word set for indicating a to-be-detected point of interest; performing a search by using a determined search word as a search keyword, to obtain a description information set for describing the to-be-detected point of interest; and inputting a name of the to-be-detected point of interest and description information in the description information set into a pre-established validity discriminant model, to obtain a status label for indicating validity of the to-be-detected point of interest.

In some embodiments, the determining a search word set for indicating a to-be-detected point of interest includes: using the name of the to-be-detected point of interest and a synonym of the name of the to-be-detected point of interest as search words in the search word set.

In some embodiments, the pre-established validity discriminant model is an attention model; and the validity discriminant model is trained and obtained by the following training: training an initial attention model by using a name of a sample point of interest and description information of the sample point of interest as inputs, and using a status label of the sample point of interest as a target, to obtain the validity discriminant model.

In some embodiments, the attention model includes a semantic recognition sub-model and a feature extraction sub-model, and the training step further includes: for one of sample points of interest, inputting a name of the sample point of interest and one piece of description information of the sample point of interest into the semantic recognition sub-model, inputting the piece of description information into the feature extraction sub-model, and splicing feature vectors output by the semantic recognition sub-model and the feature extraction sub-model to obtain a feature vector of the piece of description information for describing the sample point of interest; determining a weighted sum of the feature vectors of respective description information of the sample point of interest; determining, based on the weighted sum, a probability value belonging to the status label of the sample point of interest; and determining, based on a preset loss function, loss values of probability values of respective sample points of interest under the ground truths thereof, and propagating the determined loss values back in the attention model to adjust a model parameter of the attention model, so as to obtain the validity discriminant model.

In some embodiments, the description information of the sample point of interest is obtained by the following way: determining a first synonym set consisting of the name of the sample point of interest and a synonym of the name of the sample point of interest; determining a second synonym set consisting of the status label of the sample point of interest and a synonym of the status label of the sample point of interest; and performing a search by using a first synonym determined from the first synonym set and a second synonym determined from the second synonym set as a search word, and in the search results, using a statement in which the first synonym and the second synonym appear together as the description information of the sample point of interest.

In some embodiments, the synonym of the status label of the sample point of interest are determined based on at least one of the following: determining the synonym of the status label of the sample point of interest from a preset synonym database; or determining a preset number of target search statements from historical search statements including the name of the sample point of interest, and using a word determined from the determined target search statements and having a semantic similarity to the status label of the sample point of interest exceeding a preset similarity threshold as a synonym of the status label of the sample point of interest.

In some embodiments, the synonym of the name of the point of interest is determined based on at least one of the following: determining the synonym of the name of the point of interest from a preset encyclopedia database; performing a search by using the name of the point of interest as a search word, and using a matching entity obtained by the search as a synonym of the name of the point of interest, where the matching entity is an entity, the ratio of a longest common substring between the name of the point of interest and the name of the entity to the name of the entity exceeding a preset ratio threshold, among the entities included in a preset number of search results; or performing a search by using the name of the point of interest as a search word, extracting statements including the name of the sample point of interest from a preset number of search results, and determining from the extracted statements, by using a co-reference resolution tool, a word for indicating the name of the point of interest as a synonym; where the point of interest is one of the to-be-detected point of interest and the sample point of interest.

In a second aspect, the embodiments of the present disclosure provide an Internet text mining-based apparatus for judging the validity of a point of interest, including: a search word determination unit, configured to determine a search word set for indicating a to-be-detected point of interest; a description information determination unit, configured to perform a search by using a determined search word as a search keyword, to obtain a description information set for describing the to-be-detected point of interest; and a validity judgment unit, configured to input a name of to-be-detected point of interest and the description information in the description information set into a pre-established validity discriminant model, to obtain a status label for indicating validity of the to-be-detected point of interest.

In some embodiments, the search word determination unit is further configured to: use the name of the to-be-detected point of interest and a synonym of the name of the to-be-detected point of interest as search words in the search word set.

In some embodiments, the pre-established validity discriminant model is an attention model, the apparatus further includes a training unit, and the training unit is further configured to: train an initial attention model by using a name of a sample point of interest and description information of the sample point of interest as inputs, and using the status label of the sample point of interest as a target, to obtain the validity discriminant model.

In some embodiments, the attention model includes a semantic recognition sub-model and a feature extraction sub-model, and the training unit is further configured to: for one of sample points of interest, input a name of the sample point of interest and one piece of description information of the sample point of interest into the semantic recognition sub-model, input the piece of description information into the feature extraction sub-model, and splice feature vectors output by the semantic recognition sub-model and the feature extraction sub-model to obtain a feature vector of the piece of description information for describing the sample point of interest; determine a weighted sum of the feature vectors of respective description information of the sample point of interest; determine, based on the weighted sum, a probability value belonging to the status label of the sample point of interest; and determine, based on a preset loss function, loss values of probability values of respective sample points of interest under the ground truths thereof, and propagate the determined loss values back in the attention model to adjust a model parameter of the attention model so as to obtain the validity discriminant model.

In some embodiments, the description information of the sample point of interest is obtained by the following way: determining a first synonym set consisting of the name of the sample point of interest and a synonym of the name of the sample point of interest; determining a second synonym set consisting of the status label of the sample point of interest and a synonym of the status label of the sample point of interest; and performing a search by using a first synonym determined from the first synonym set and a second synonym determined from the second synonym set as a search word, and in the search results, using a statement in which the first synonym and the second synonym appear together as the description information of the sample point of interest.

In some embodiments, the synonym of the status label of the sample point of interest are determined based on at least one of the following: determining the synonym of the status label of the sample point of interest from a preset synonym database; or determining a preset number of target search statements from historical search statements including the name of the sample point of interest, and using a word determined from the determined target search statements and having a semantic similarity to the status label of the sample point of interest exceeding a preset similarity threshold as a synonym of the status label of the sample point of interest.

In some embodiments, the apparatus further includes: a synonym determination unit, configured to determine the synonym of the name of the point of interest based on at least one of the following: determining the synonym of the name of the point of interest from a preset encyclopedia database; performing a search by using the name of the point of interest as a search word, and using a matching entity obtained by the search as a synonym of the name of the point of interest, where the matching entity is an entity, the ratio of the longest common substring between the name of the point of interest and the name of the entity to the name of the entity exceeding a preset ratio threshold, among the entities included in a preset number of search results; or performing a search by using the name of the point of interest as a search word, extracting statements including the name of the sample point of interest from a preset number of search results, and determining from the extracted statements, by using a co-reference resolution tool, a word for indicating the name of the point of interest as a synonym; where the point of interest is one of the to-be-detected point of interest and the sample point of interest.

In a third aspect, the embodiments of the present disclosure provide an electronic device, including: one or more processors; and a storage apparatus for storing one or more programs, where when the one or more programs are executed by the one or more processors, the one or more processors implement the method described in the first aspect.

In a fourth aspect, the embodiments of the present disclosure provide a computer readable storage medium on which computer programs are stored, where when the programs are executed by the processors, the method in the first aspect is implemented.

In the Internet text mining-based method and apparatus for judging the validity of a point of interest according to the embodiments of the present disclosure, a search word set for indicating a to-be-detected point of interest is determined first, then a search is performed by using a determined search word as a search keyword, to obtain a description information set for describing search words in the search word set, and the name of the to-be-detected point of interest and the description information in the description information set are input into an established validity discriminant model, to obtain a status label for indicating the validity of the to-be-detected point of interest. Thereby invalid POI information in a map (e.g., invalid POI information in a map application or a navigation application) may be discovered in time through the Internet text mining and the determination of the validity of the POI on the basis of the model. Thus, more accurate information are provided for users, user needs are met, and user experience is improved.

BRIEF DESCRIPTION OF THE DRAWINGS

Other features, objectives and advantages of the present disclosure will become more apparent by reading detailed descriptions of non-restrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
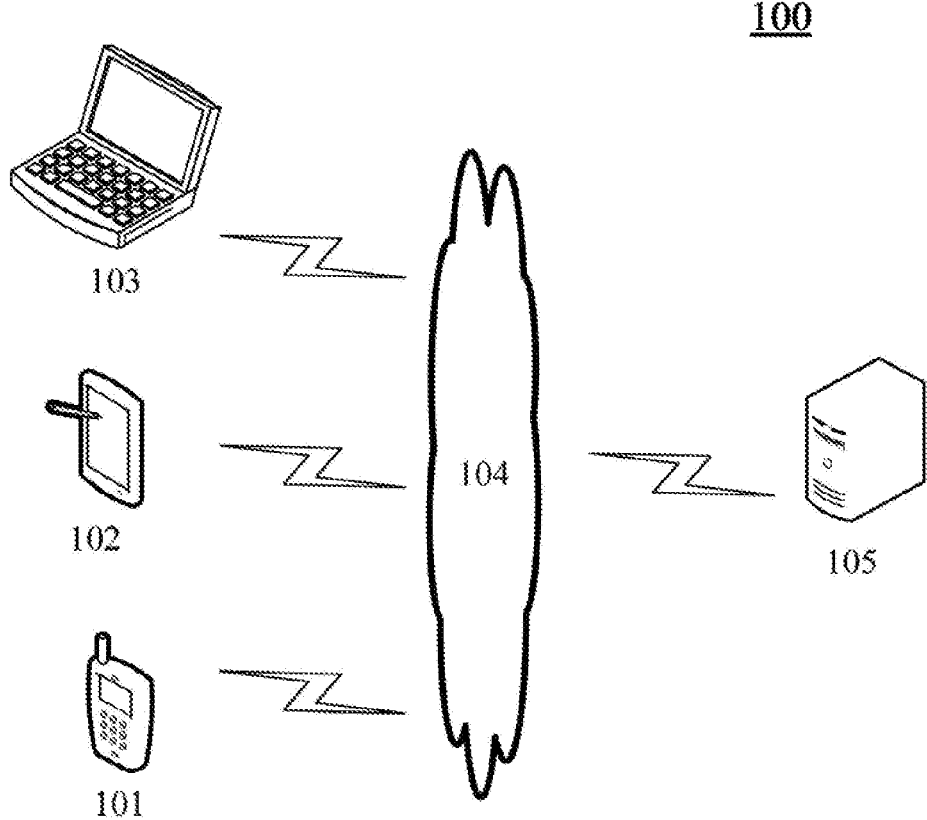
FIG. 1 is an exemplary system architecture diagram to which an Internet text mining-based method for judging the validity of a point of interest can be applied according to an embodiment of the present disclosure.

FIG. 1 shows an exemplary system architecture 100 that may be applied to the embodiments of an Internet text mining-based method for judging the validity of a point of interest or an Internet text mining-based apparatus for judging the validity of a point of interest according to the present disclosure.

As shown in FIG. 1, the system architecture 100 may include terminal devices 101, 102 and 103, a network 104, and a server 105. The network 104 is configured to provide a medium for a communication link between the terminal devices 101, 102 and 103 and the server 105. The network 104 may include various connection types, such as wired or wireless communication links or optical fiber cables.

The terminal devices 101, 102 and 103 may be hardware or software. When being hardware, the terminal devices 101, 102 and 103 may be various types of electronic devices with display screens, including but not limited to a smart phone, a tablet computer, an e-book reader, an MP3 player (Moving Picture Experts Group Audio Layer III), an MP4 player (Moving Picture Experts Group Audio Layer IV), a laptop computer, a desktop computer, etc. When being software, the terminal devices 101, 102 and 103 may be installed in the electronic devices listed above. The terminal devices 101, 102 and 103 may be implemented as a plurality of software or software modules (e.g., a plurality of software or software modules for providing distributed services), or implemented as a single software or software module, which is not specifically limited herein.

The server 105 may be a server providing various services, for example, a navigation server capable of providing navigation services for users using the terminal devices 101, 102 or 103. The navigation server may analyze the received data such as a user navigation destination, and feed a processing result (e.g., information indicating whether the POI indicated by the navigation destination is valid on the basis of the analysis result) back to the terminal device.

It should be noted that the Internet text mining-based method for judging the validity of a point of interest, provided by embodiments of the present disclosure, may be executed by the server 104, and accordingly, the Internet text mining-based apparatus for judging the validity of a point of interest may be arranged in the server 104.

It should be appreciated that the numbers of the terminal devices 101, 102 and 103, the network 104 and the server 105 shown in FIG. 1 are only schematic. According to an implementation requirement, any number of terminal devices, networks and servers may be provided.

Figure 2:
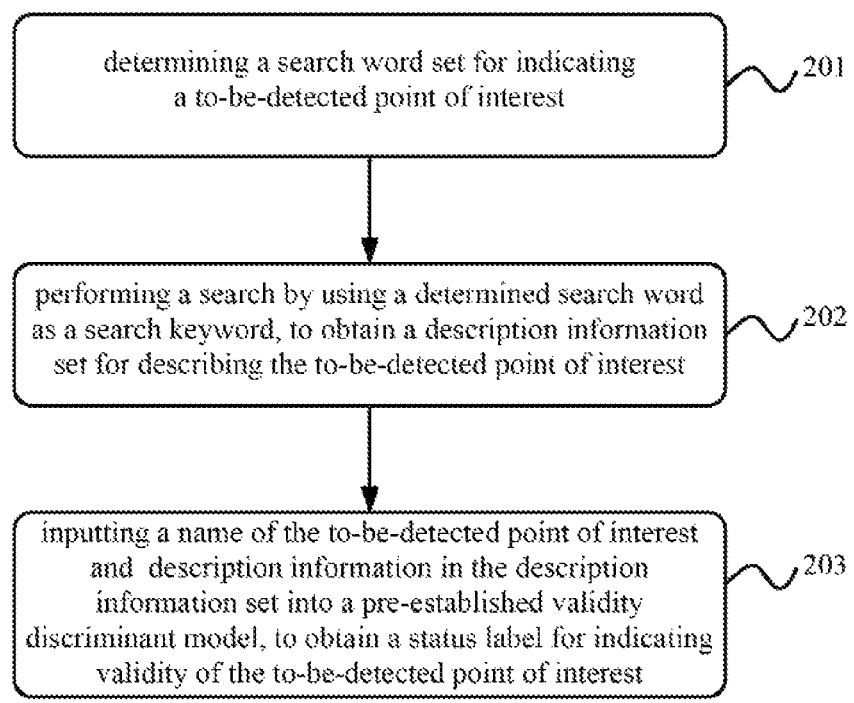
FIG. 2 is a flowchart of the Internet text mining-based method for judging the validity of a point of interest according to an embodiment of the present disclosure.

Continue to refer to FIG. 2, which shows a process 200 of the Internet text mining-based method for judging the validity of a point of interest according to an embodiment of the present disclosure. The Internet text mining-based method for judging the validity of a point of interest includes the following steps:

Step 201: determining a search word set for indicating a to-be-detected point of interest.

The to-be-detected POI may be any POI in a map application or a navigation application.

In some optional implementations, the service provider of the map application or the navigation application may maintain a POI database, and the POI database may store names and related information of POIs that may provide map and/or navigation services.

In some application scenarios of these optional implementations, the service provider of the map application or the navigation application may update the statuses of POIs in the POI database regularly (e.g., at a preset time interval) or irregularly to improve the accuracy of the POIs provided by the database.

In these application scenarios, the to-be-detected point of interest may be any POI among the POIs that currently need status update and acknowledgment in the POI database.

Alternatively, in other application scenarios, a user who uses a map application or a navigation application inputs the name of a POI as a destination to which he or she is going. Then, a service provider may use the POI as a to-be-detected point of interest.

In this embodiment, an executive body (e.g., the server 105 shown in FIG. 1) of the Internet text mining-based method for judging the validity of a point of interest may determine a search word set for indicating a to-be-detected point of interest by various feasible ways.

For example, as some optional implementations, a name of a to-be-detected POI may be directly used as a search word in the search word set.

Alternatively, in some other optional implementations, the names of the to-be-detected POI in multiple languages may be used as search words in the search word set. For example, if the to-be-detected POI is "Beijing Capital International Airport," the Chinese name "Beijing Shoudu Guoji Jichang" of the to-be-detected POI and the corresponding English name "Beijing Capital International Airport" may be used as search words in the search word set.

Alternatively, in some other optional implementations, the abbreviations of the to-be-detected POI may also be used as search words in the search word set. For example, if the to-be-detected POI is "Beijing Capital International Airport," the abbreviations of "Beijing Capital International Airport," such as "Capital International Airport" or "Capital Airport," may be used as search words in the search word set.

Step 202: performing a search by using a determined search word as a search keyword, to obtain a description information set for describing the to-be-detected point of interest.

Here, for example, a search word in the search word set may be used as one query, to obtain a search result.

It may be appreciated that each search word in the search word set may be used as a query for search to obtain a series of search results. These search results may, for example, be in the form of links presented on search result pages.

In some optional implementations, statements for describing the search word in the pages obtained by linking a front preset number of search result links presented on the search result pages may be used as description information for describing the to-be-detected point of interest.

Specifically, in some application scenarios of these optional implementations, if the name of the to-be-detected POI is "Beijing Capital International Airport," and "Capital Airport" is a search word in the search word set, then the "Capital Airport" may be used as a query for search to obtain a series of search results. In a webpage obtained by clicking one of the search result links, for example, a statement "Recently, the Capital Airport will take more stringent security inspection measures, please arrange reasonable time to arrive at the airport for check-in and check-up procedures" is included, then, the statement may be used as a piece of description information of the to-be-detected POI "Beijing Capital International Airport."

Step 203: inputting a name of the to-be-detected point of interest and description information in the description information set into a pre-established validity discriminant model, to obtain a status label for indicating validity of the to-be-detected point of interest.

The validity discriminant model in this step may determine a status label of the to-be-detected point of interest according to the name of the to-be-detected point of interest and the description information in the description information set. Here, "validity" may be interpreted as whether the to-be-detected point of interest is currently in a valid status.

For example, the to-be-detected point of interest is the A mall. The status label for indicating the validity of the A mall may be, for example, "open," "close down," "close," "relocated," etc. It may be appreciated that, in these status labels, "open" may be a status label for indicating that the A mall is in a valid status, and "close down," "close" or "relocated" may be a status label for indicating that the A mall is in an invalid status.

In some optional implementations, for example, a status label set of status labels for characterizing the validity of the POI may be preset.

In these optional implementations, the respective status labels in the status label set may be matched with the description information in the description information set, for example, to determine semantic similarities between description information and status labels, and the status label in the status label set, having the highest semantic similarity to the description information in the description information set, is used as a status label for indicating the validity of the to-be-detected point of interest.

In the Internet text mining-based method for judging the validity of a point of interest according to the present embodiment, a search word set for indicating a to-be-detected point of interest is determined first, then a search is performed by using a determined search word as a search keyword to obtain a description information set for describing the search word in the search word set, and the name of the to-be-detected point of interest and the description information in the description information set are input into an established validity discriminant model to obtain a status label for indicating the validity of the to-be-detected point of interest. Thereby invalid POI information in a map may be discovered in time through Internet text mining and the determination of the validity of the POI on the basis of the model. Thus, more accurate information are provided for users, user needs are met, and user experience is improved.

Figure 3:
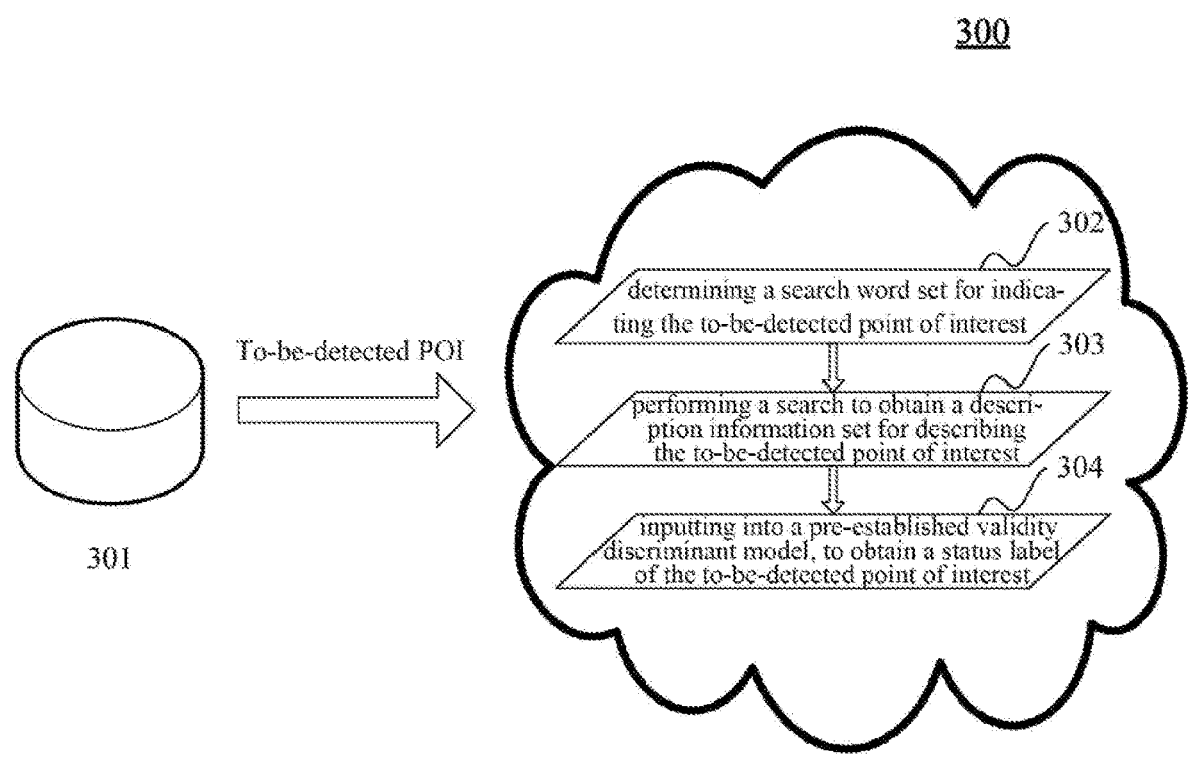
FIG. 3 is a schematic diagram of an application scenario of the Internet text mining-based method for judging the validity of a point of interest according to the present disclosure.

Continue to refer to FIG. 3, which is a schematic diagram of an application scenario 300 of the Internet text mining-based method for judging the validity of a point of interest according to the present disclosure.

In the application scenario shown in FIG. 3, a service provider of a map or navigation service acquires a to-be-detected POI "XXX clothing wholesale market" from a database 301 storing POIs.

Then, as indicated by reference sign 302, a search word set for the to-be-detected POI may be determined. The search word set includes search words "XXX clothing wholesale market," "XXX clothing market" and "XXX wholesale market."

Next, as indicated by reference sign 303, searches with the search words "XXX clothing wholesale market," "XXX clothing market" and "XXX wholesale market" being respectively used as search keywords are performed, to obtain a series of search results. From the search results, statements for describing the search words may be extracted as the description information of the to-be-detected POI "XXX clothing wholesale market," and a description information set is formed.

Next, as indicated by reference sign 303, the to-be-detected POI "XXX clothing wholesale market" and the description information set are input into a pre-established validity discriminant model to obtain a status label for indicating whether the "XXX clothing wholesale market" is valid, for example, relocation. In this way, by the method of this embodiment, whether the to-be-detected POI is in a valid status may be determined, so that the user who uses the map or navigation application may obtain the accurate status of the POI in time and obtain more accurate map and/or navigation information during POI query and/or navigation.

In some optional implementations of the Internet text mining-based method for judging the validity of a point of interest according to the present embodiment, step 201 of determining a search word set for indicating a to-be-detected point of interest may include: using the name of the to-bedetected point of interest and a synonym of the name of the to-be-detected point of interest as search words in the search word set.

Generally, a certain official accurate name of a POI is not the most well-known and most commonly-used name for the public. In this case, in order to collect the description information of the to-be-detected POI as comprehensively and accurately as possible, and to avoid misjudgment of the status label caused by insufficient diversity of the description information collected, during determining a search word set of a to-be-detected POI, not only may a name of the to-be-detected POI be used as a search word in the search word set, but also may a synonym of the to-be-detected POI may be used as a search word in the search word set.

In some application scenarios of these optional implementations, the synonym of the name of the to-be-detected POI may be determined from a preset encyclopedia database. Generally, the encyclopedia database has the characteristics of comprehensive and accurate data collection. In addition, the data of each term in the encyclopedia database usually contains synonyms of the term.

In some other application scenarios of these optional implementations, the name of the to-be-detected POI may also be used as a search word for search, and a matching entity obtained by the search may be used as a synonym of the name of the point of interest. Here, the matching entity may be an entity, the ratio of the longest common substring between the name of the to-be-detected point of interest and the name of the entity to the name of the entity exceeding a preset ratio threshold, among the entities included in a preset number of search results.

In these application scenarios, for example, the to-be-detected POI is "AAA clothing market." The "AAA clothing market" may be used as a search word for search. First N (e.g., first 10) search results are selected from the search results presented on the search result pages. Among the N search results, candidate entities are determined using a Named Entity Recognition (NER) algorithm. Among the candidate entities, a candidate entity, the ratio of the longest common substring between the to-be-detected point of interest and the name of the entity to the name of the entity exceeding a preset ratio threshold (e.g., 50%), is used as the matching entity.

The longest common substring, also referred to as the largest common substring, may indicate the longest substring among common substrings included in two or more character strings. For example, if a certain candidate entity is "AAA clothing wholesale market," the largest common substring between the candidate entity and the name of the to-be-detected POI is "AAA clothing." Here, the ratio (5/9) of the largest common substring "AAA clothing" in the "AAA clothing wholesale market" entity name is more than 50%, so "AAA clothing wholesale market" may be used as a synonym of the to-be-detected POI "AAA clothing market."

In some other application scenarios of these optional implementations, the name of the to-be-detected POI may be used as a search word for search, statements including the name of the to-be-detected POI are extracted from a preset number of search results, and words for indicating the name of the point of interest are determined as a synonym from the extracted statements by using a co-reference resolution tool.

In real life, in order to avoid repetition, people used to use a pronoun, a title or an abbreviation to refer to the full entity name mentioned above. Co-reference resolution is a technique for determining all pronouns for characterizing the same entity from a text.

By using the co-reference resolution tool, a pronoun for indicating the to-be-detected POI may be determined from a preset number of search results (e.g., first N search results) obtained by search using the to-be-detected POI as a search word, and the determined pronoun is used as a synonym of the name of the to-be-detected POI.

The co-reference resolution algorithm is a technique that has been widely studied at present, and a person skilled in the art may use a co-reference resolution algorithm that is existing or to be developed in the future to determine a pronoun for indicating the to-be-detected POI from a preset number of search results obtained by search using the to-be-detected POI as a search word.

It may be appreciated that, in order to make the synonyms of the to-be-detected POI included in the determined search word set more comprehensive, any combination of at least two of the above methods for determining the synonyms of the to-be-detected POI may be used to determine the synonyms of the to-be-detected POI.

Figure 4:
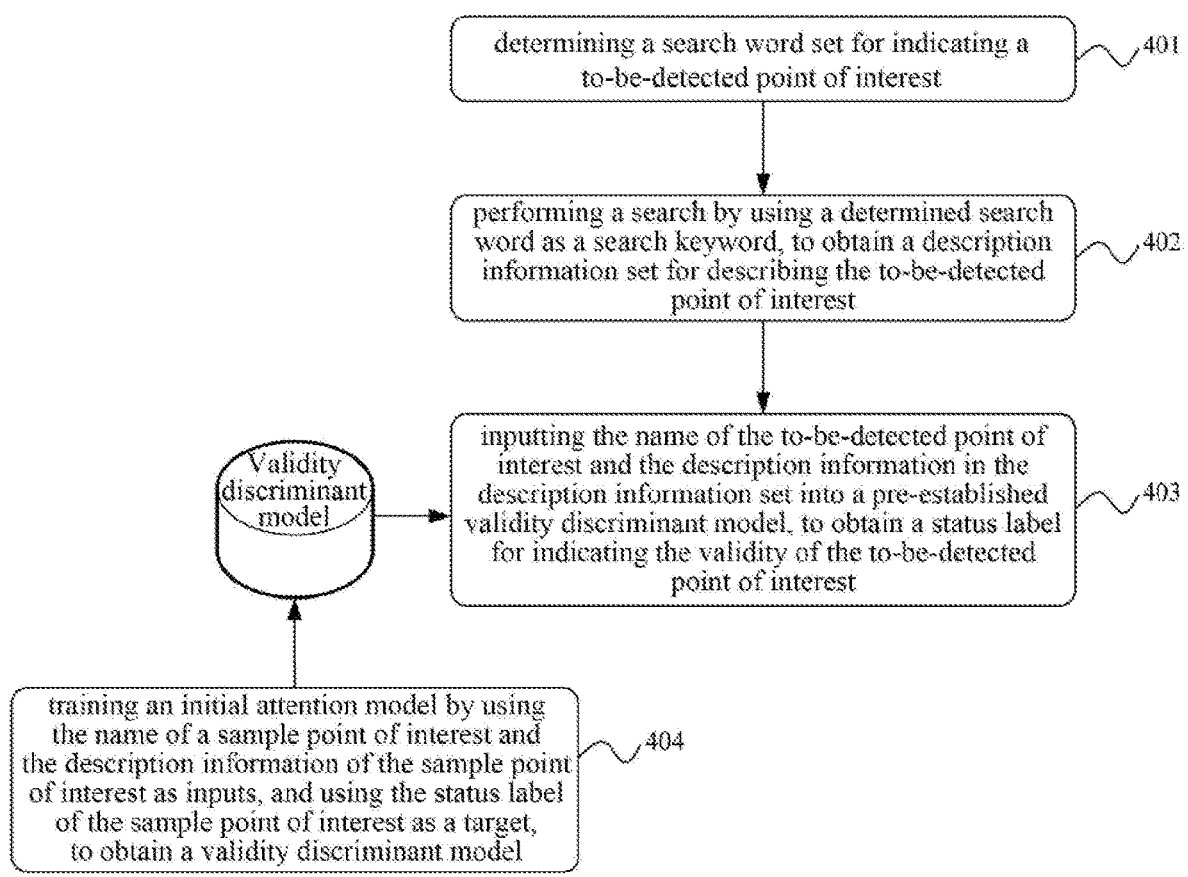
FIG. 4 is a flowchart of the Internet text mining-based method for judging the validity of a point of interest according to another embodiment of the present disclosure.

Further refer to FIG. 4, which shows a process 400 of the Internet text mining-based method for judging the validity of a point of interest. The process 400 of the Internet text mining-based method for judging the validity of a point of interest includes the following steps:

Step 401: determining a search word set for indicating a to-be-detected point of interest.

Step 402: performing a search by using a determined search word as a search keyword to obtain a description information set for describing the to-be-detected point of interest.

Step 403: inputting the name of the to-be-detected point of interest and the description information in the description information set into a pre-established validity discriminant model to obtain a status label for indicating the validity of the to-be-detected point of interest.

Steps 401 to 403 may be executed similar to Steps 201 to 203 of the embodiment shown in FIG. 2, and details are not described herein again.

Different from the embodiment shown in FIG. 2, the pre-established validity discriminant model in this embodiment is an attention model.

The attention model simulates an attention model of human brain. For example, when we look at a picture, we can see the whole picture, but when we observe the picture deeply and carefully, our eyes actually focus on a very small piece. At this time, human brain mainly focuses on this small piece of pattern. That is to say, the human brain's attention to the whole picture at this time is not balanced, but has certain weight difference. This is the core idea of the Attention Model in deep learning.

When being applied to the Internet text mining-based method for judging the validity of a point of interest according to the present embodiment, the attention model may determine weights for the respective pieces of description information input thereto, and determine, based on a weighted sum of the respective pieces of description information of the to-be-detected POI, the status label having the largest probability as the status label for indicating the validity of the to-be-detected POI.

With reference to FIG. 4, in this embodiment, the attention model may be trained by the following steps:

Step 404: training an initial attention model by using the name of a sample point of interest and the description information of the sample point of interest as inputs, and using the status label of the sample point of interest as a target, to obtain the validity discriminant model.

Initial parameters may be set for the initial attention model to obtain a probability of a true status label of the sample point of interest. By constantly adjusting the parameters in the model, the probability of the true status label of the sample point of interest output by the model is as close as possible to 100%.

In some application scenarios, the description information of the sample point of interest is obtained as follows:

First, a first synonym set consisting of the name of the sample point of interest and synonyms of the name of the sample point of interest is determined. For example, if the name of the sample point of interest is A, and the synonyms of the sample point of interest are A1, . . . , AM, then the first synonym set is Set_name={A,A1, . . . , AM}.

It may be appreciated that, in this embodiment, the synonyms of the name of the sample point of interest may be determined by a method similar to the determination method for the to-be-detected point of interest in the embodiment shown in FIG. 2. For example, the synonyms of the name of the sample point of interest may be determined from a preset encyclopedia database; and/or, the name of the sample point of interest may also be used as a search word for search, and the matching entities obtained by the search may be used as the synonyms of the name of the sample point of interest, where the matching entities are entities, the ratios of the longest common substrings between the name of the sample point of interest and the names of the entities to the names of the entities exceeding a preset ratio threshold, among the entities included in a preset number of search results; and/or, the name of the sample point of interest may also be used as a search word for search, then statements including the name of the sample point of interest are extracted from a preset number of search results, and words for indicating the name of the sample point of interest are determined as the synonyms from the extracted statements by using a co-reference resolution tool.

Next, a second synonym set consisting of the status label of the sample point of interest and synonyms of the status label of the sample point of interest is determined. For example, if the status label of the point of interest is B, and the synonyms of the status label are B1, . . . , BN, then the second synonym set is Set_lable={B,B1, . . . , BN}.

Alternatively, the synonyms of the status label may be determined by at least one of the following:

The synonyms of the status label of the sample point of interest are determined from a preset synonym database. And/or, a preset number of target search statements are determined from historical search statements including the name of the sample point of interest, and words determined from the determined target search statements and having semantic similarities to the status label of the sample point of interest exceeding a preset similarity threshold are used as the synonyms of the status label of the sample point of interest.

Finally, a first synonym determined from the first synonym set and a second synonym determined from the second synonym set are used as search words for search. In the search results, the statements in which the first synonym and the second synonym appear together are used as the description information of the sample point of interest.

For example, the first synonym set is Set_name={A,A1, . . . , AM}, and the second synonym set is Set_lable={B,B1, . . . , BN}. Then, a search word set $L=\{AB,AB_1, \ldots, AB_N, A_1B, A_1B_1 \ldots, A_1B_N, \ldots A_MB_N\}$ may be obtained. Each element in the search word set is used as a search word for search, and in the search results, the statements in which a first synonym and a second synonym appear together are used as the description information of the sample point of interest.

It may be appreciated that in the process of collecting the sample point of interest and the description information and status label thereof, in order to obtain higher prediction accuracy of the finally trained model, the training samples may include both positive samples and negative samples. That is to say, the training samples may include samples of which status labels indicate the sample point of interest in a valid status, and samples of which status labels indicate the sample point of interest in an invalid status.

Figure 5:
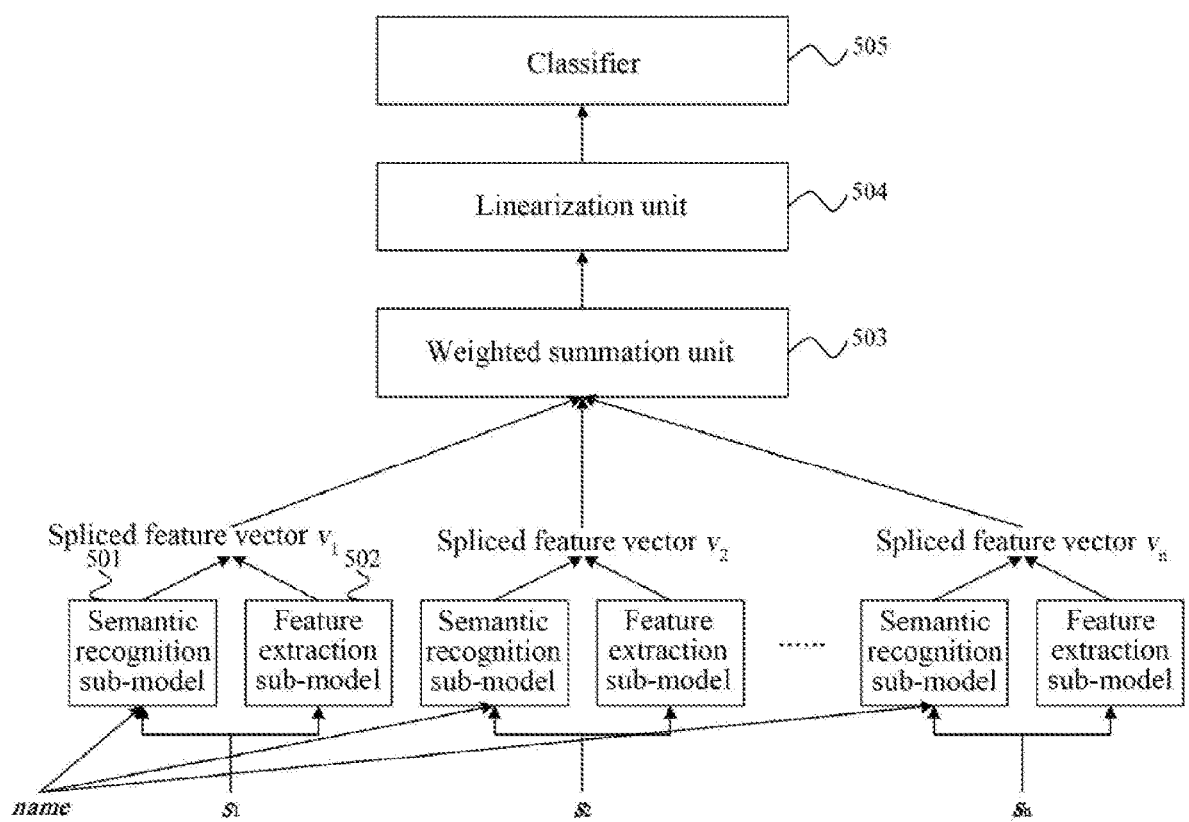
FIG. 5 is a schematic structure diagram of a validity discriminant model according to an optional implementation of the present disclosure.
Figure 6:
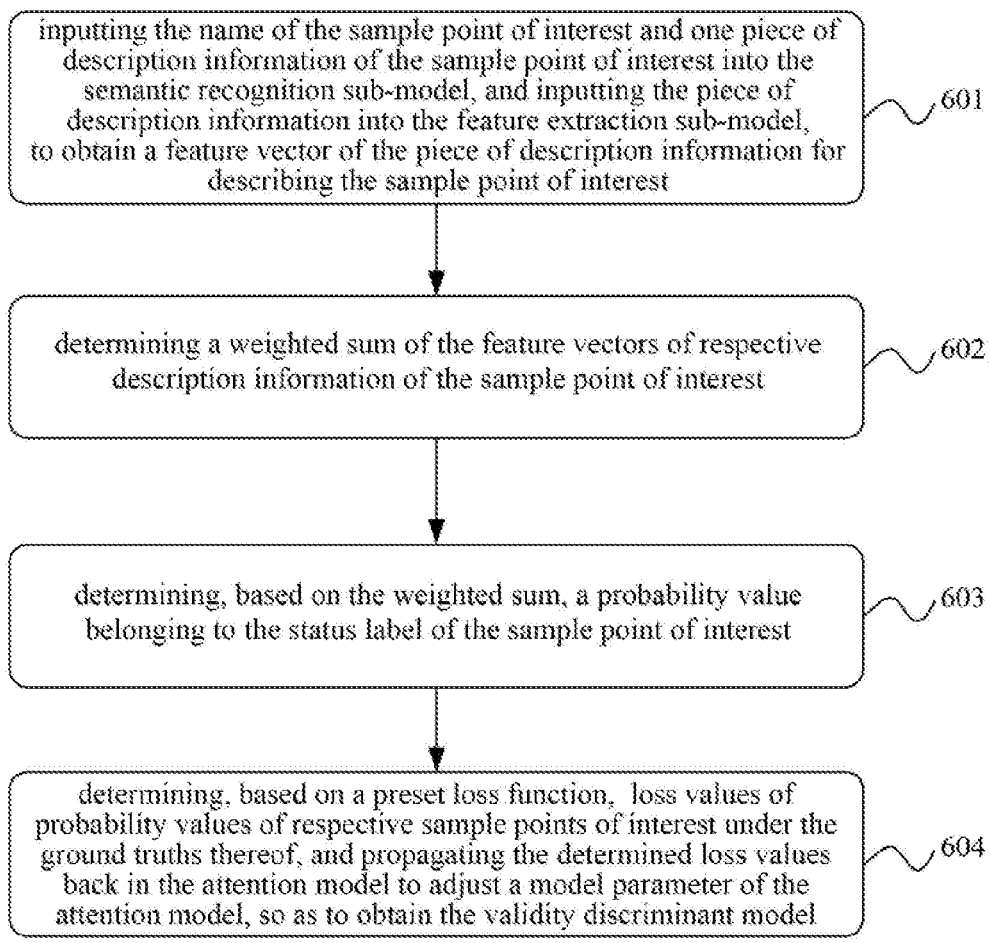
FIG. 6 is a schematic flowchart of a training method for the validity discriminant model according to an optional implementation of the present disclosure.

The following further describes the structure of the attention model and the training method thereof in some optional implementations of this embodiment with reference to FIG. 5 and FIG. 6.

Specifically, FIG. 5 shows a specific structure of the attention model in some optional implementations of this embodiment, and FIG. 6 shows a specific execution process of training steps of the attention model in these optional implementations.

Refer to FIG. 5, the attention model 500 may include a semantic recognition sub-model 501, a feature extraction sub-model 502, a weighted summation unit 503, a linearization unit 504, a classifier 505, etc.

The semantic recognition sub-model 501 may be configured to extract semantic features of the name of a sample POI and a piece of description information $s_i$ (i=1, 2, . . . , n) input therein to obtain a semantic feature vector.

The feature extraction sub-model 502 may be configured to perform feature extraction from the name of the sample POI and one piece of description information $s_i$ (i=1, 2, . . . , n) thereof on the basis of a certain one or several preset rules, to obtain a description feature vector for characterizing the piece of description information of the sample POI.

In some application scenarios, on the basis of a preset rule, the feature extraction sub-model 502 may extract at least one of the following features: a feature for characterizing a status label of the sample point of interest or the number of synonyms of the status label of the sample point of interest in the description information; and a feature for characterizing whether the description information includes a label word. It may be appreciated that the label word here may include not only a status label itself, but also the synonyms of the status label.

It may be appreciated that in the attention model 500, the specific numbers of the semantic recognition sub-model 501 and the feature extraction sub-model 502 are not limited.

Specifically, the attention model may include one semantic recognition sub-model and one feature extraction sub-model, and then the semantic recognition sub-model and the feature extraction sub-model may serially extract the semantic features and description features of the name and description information of a sample POI respectively, and respectively obtain semantic feature vectors and description feature vectors of the respective pieces of description information aiming at the sample POI.

Alternatively, as shown in FIG. 5, the attention model 500 may also include a plurality of semantic recognition sub-models 501 and a plurality of feature extraction sub-models 502. In this way, the respective semantic recognition sub-models and the respective feature extraction sub-models may perform semantic feature extraction and description feature extraction in parallel.

In addition, the attention model further includes a weighted summation unit 503. The weighted summation unit 503 may perform weighted summation on spliced feature vectors which are obtained by splicing the semantic feature vectors recognized by the semantic recognition sub-model and the description feature vectors extracted by the feature extraction sub-model for the description information of the sample POI, the weighted sum is linearized by the linearization unit 504, and finally the linearization result is classified by the classifier 505 to obtain a probability that the sample POI has a ground truth thereof.

In this way, the weighting coefficient in the weighted summation unit 503 may be adjusted accordingly by constantly adjusting the model parameters in the attention model, so that the probability that the sample POI has a ground truth, output by the attention model, continuously increases.

Refer to FIG. 6, which further specifically illustrates a process of training the attention model.

In step 601, for one of sample points of interest, the name of the sample point of interest and one piece of description information of the sample point of interest are input to the semantic recognition sub-model, and the piece of description information is input to the feature extraction sub-model, and feature vectors output by the semantic recognition sub-model and the feature extraction sub-model are spliced to obtain a feature vector of the piece of description information for describing the sample point of interest.

Figure 7:
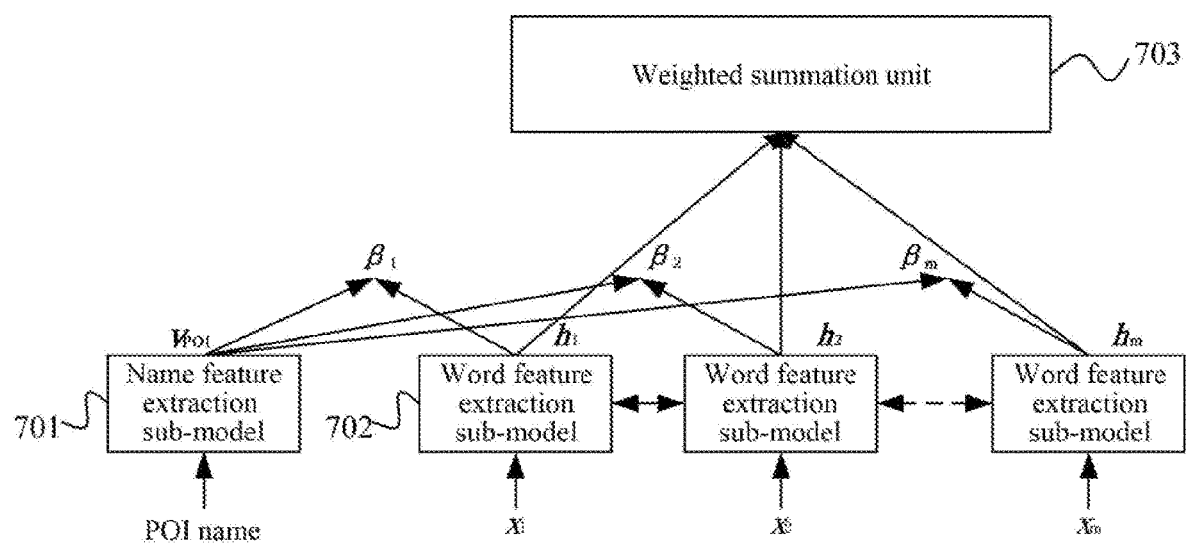
FIG. 7 is a schematic structure diagram of a semantic recognition sub-model in the validity discriminant model according to an optional implementation of the present disclosure.

In some optional implementations, the semantic recognition sub-model may also be an attention model. Refer to FIG. 7, which is a schematic structure diagram of one embodiment of a semantic recognition sub-model based on an attention model.

The semantic recognition sub-model includes a name feature extraction sub-model 701, at least one word feature extraction sub-model 702, and a weighted summation unit 703. The name feature extraction sub-model 701 and the word feature extraction sub-model 702 are both modeled on the basis of a bidirectional LSTM (Long Short-Term Memory). For a sentence including m words, words $x_1 \sim x_m$ are input to the word feature extraction sub-model 702 to obtain a series of hidden vectors $h_1, h_2, \ldots, h_m$. In addition, feature extraction is performed on the POI name by using the name feature extraction sub-model to obtain a name vector $v_{POI}$. Through an attention mechanism, one weight $\beta_i$ (i=1,2, . . . , m) is calculated by using the name vector $v_{POI}$ and each of the hidden vectors. A semantic vector representation vs of the description information is calculated by the weighted summation unit 703 based on the calculated weights $\beta_1, \beta_2, \ldots \beta_m$.

Specifically:

$$v_s = \sum_{i=1}^{m} \beta_i h_i \quad (1)$$

$$\beta_i = \frac{\exp(a_i)}{\sum_{j=1}^{m} \exp(a_j)}$$

$$a_i = v_{POI}^T h_i$$

Then, the semantic feature vector $v_s$ obtained by the semantic recognition sub-model is spliced with the description feature vector extracted by the feature extraction sub-model, to obtain a vector representation $v_{sen}$ for every piece of description information.

In step 602, a weighted sum of the feature vectors of the respective description information of the sample point of interest is determined.

Specifically, using the attention mechanism, a weighted sum $v_c$ of the respective spliced feature vectors of the sample point of interest is calculated:

$$v_c = \sum_{i=1}^{n} \eta_i v_{sen}^i \quad (2)$$

$$\eta_i = \frac{\exp(q_i)}{\sum_{j=1}^{n} \exp(q_j)}$$

$$q_i = v_a^T v_{sen}^i$$

Where $v_a$ is a model parameter, and may be constantly adjusted during the training process.

In step 603, a probability value belonging to the status label of the sample point of interest is determined based on the weighted sum.

Specifically, the weighted sum $v_c$ obtained in step 602 is linearly transformed, and then input into the classifier for predicting label probability distribution. The label of the highest probability is predicted as the status label of the sample POI.

In step 604, based on a preset loss function, a loss value of the probability value of each sample point of interest under the ground truth thereof is determined, and the determined loss value is propagated back in the attention model, to adjust a model parameter of the attention model so as to obtain the validity discriminant model.

For example, the loss function may be a negative log likelihood function of a correct label:

$$L = -\Sigma_i \log p_{ij} \quad (3)$$

In formula (3), j is a correct label of the i-th sample POI in the training sample set. In this way, the loss value of the training sample may be calculated by using the above formula (3), the model parameter is adjusted by the back propagation (e.g., based on a stochastic gradient descent algorithm) of the loss value in the model, and then the attention model is trained.

It may be seen from FIG. 4 to FIG. 7 that, compared with the embodiment corresponding to FIG. 2, the process 400 of the Internet text mining-based method for judging the validity of a point of interest according to the present embodiment uses a validity discriminant model based on an attention model to recognize the status label of the to-be-detected point of interest, so that the validity discriminant model can recognize, in the description information, the information that is more important for judging the status of the POI, and further the finally predicted status label is more accurate.

Figure 8:
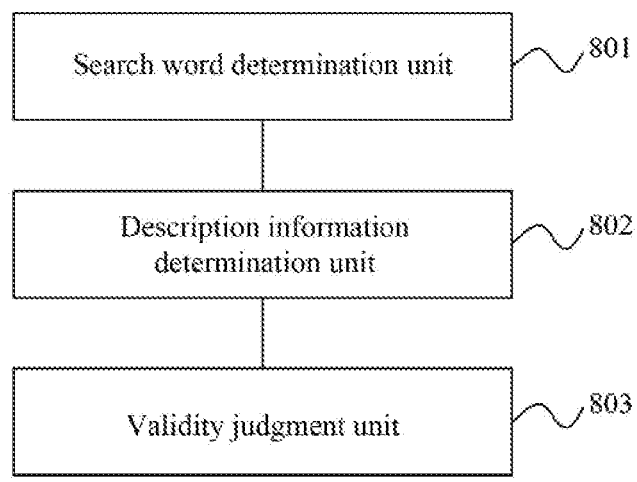
FIG. 8 is a structure diagram of an Internet text mining-based apparatus for judging the validity of a point of interest according to an embodiment of the present disclosure.

Further refer to FIG. 8, as an implementation of the method shown in the above figures, the present disclosure provides an embodiment of an Internet text mining-based apparatus for judging the validity of a point of interest, the embodiment of the apparatus corresponds to the embodiment of the method shown in FIG. 2, and the apparatus may be specifically applied to various electronic devices.

As shown in FIG. 8, the apparatus for judging the validity of a point of interest based on Internet text mining according to the present embodiment includes a search word determination unit 801, a description information determination unit 802, and a validity judgment unit 803.

The search word determination unit 801 may be configured to determine a search word set for indicating a to-be-detected point of interest.

The description information determination unit 802 may be configured to perform a search by using a determined search word as a search keyword, to obtain a description information set for describing the to-be-detected point of interest.

The validity judgment unit 803 may be configured to input a name of to-be-detected point of interest and the description information in the description information set into a pre-established validity discriminant model, to obtain a status label for indicating validity of the to-be-detected point of interest.

In some optional implementations, the search word determination unit 801 may be further configured to: use the name of the to-be-detected point of interest and a synonym of the name of the to-be-detected point of interest as search words in the search word set.

In some optional implementations, the pre-established validity discriminant model may be an attention model.

In these optional implementations, the apparatus may further include a training unit (not shown). The training unit may be further configured to: train an initial attention model by using a name of a sample point of interest and description information of the sample point of interest as inputs, and using the status label of the sample point of interest as a target, to obtain the validity discriminant model.

In some optional implementations, the attention model may include a semantic recognition sub-model and a feature extraction sub-model.

In these optional implementations, the training unit may be further configured to: for one of sample points of interest, input a name of the sample point of interest and one piece of description information of the sample point of interest into the semantic recognition sub-model, input the piece of description information into the feature extraction sub-model, and splice feature vectors output by the semantic recognition sub-model and the feature extraction sub-model to obtain a feature vector of the piece of description information for describing the sample point of interest; determine a weighted sum of the feature vectors of respective description information of the sample point of interest; determine, based on the weighted sum, a probability value belonging to the status label of the sample point of interest; and determine, based on a preset loss function, loss values of probability values of respective sample points of interest under the ground truths thereof, and propagate the determined loss values back in the attention model to adjust a model parameter of the attention model, so as to obtain the validity discriminant model.

In some optional implementations, the description information of the sample point of interest may be obtained by the following way: determining a first synonym set consisting of the name of the sample point of interest and a synonym of the name of the sample point of interest; determining a second synonym set consisting of the status label of the sample point of interest and a synonym of the status label of the sample point of interest; and performing a search by using a first synonym determined from the first synonym set and a second synonym determined from the second synonym set as a search word, and in the search results, using a statement in which the first synonym and the second synonym appear together as the description information of the sample point of interest.

In some optional implementations, the synonym of the status label of the sample point of interest may be determined based on at least one of the following: determining the synonym of the status label of the sample point of interest from a preset synonym database; or determining a preset number of target search statements from historical search statements including the name of the sample point of interest, and using a word determined from the determined target search statements and having a semantic similarity to the status label of the sample point of interest exceeding a preset similarity threshold as a synonym of the status label of the sample point of interest.

In some optional implementations, the apparatus may further include a synonym determination unit.

The synonym determination unit may be configured to determine the synonym of the name of the point of interest based on at least one of the following: determining the synonym of the name of the point of interest from a preset encyclopedia database; or performing a search by using the name of the point of interest as a search word, and using a matching entity obtained by the search as a synonym of the name of the point of interest, where the matching entity is an entity, the ratio of the longest common substring between the name of the point of interest and the name of the entity to the name of the entity exceeding a preset ratio threshold, among the entities included in a preset number of search results; or performing a search by using the name of the point of interest as a search word, extracting statements including the name of the sample point of interest from a preset number of search results, and determining from the extracted statements, by using a co-reference resolution tool, a word for indicating the name of the point of interest as the a synonym. Here, the point of interest may be one of a to-be-detected point of interest and a sample point of interest.

Figure 9:
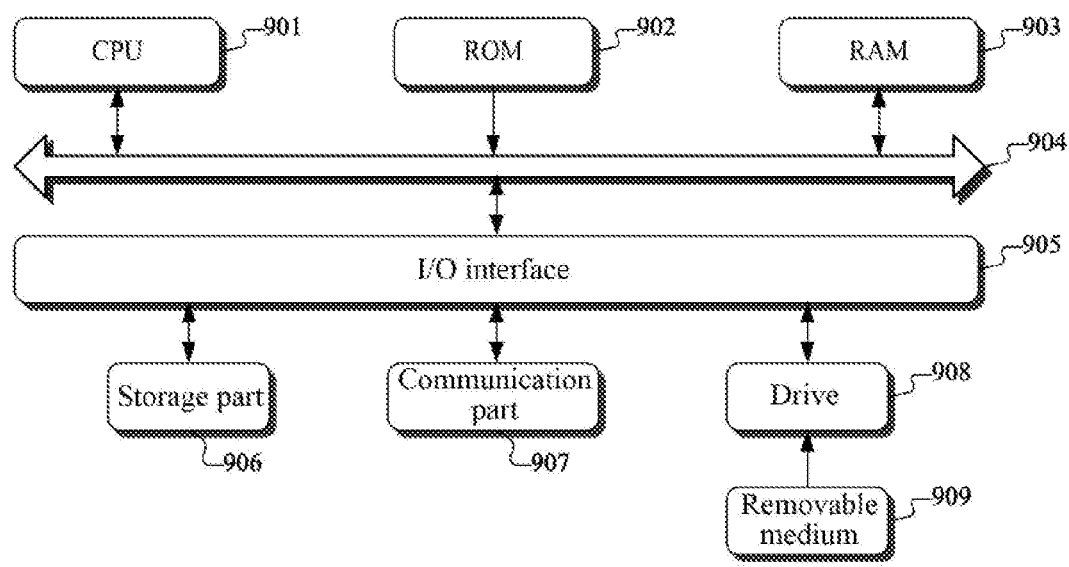
FIG. 9 is a structure diagram of a computer system of an electronic device suitable for implementing the Internet text mining-based method for judging the validity of a point of interest according to the embodiments of the present disclosure.

Referring to FIG. 9, a schematic structural diagram of a computer system 900 of an electronic device adapted to implement an Internet text mining-based method for judging validity of a point of interest according to the embodiments of the present disclosure is shown. The electronic device shown in FIG. 6 is merely an example, and should not limit the function and scope of use of the embodiments of the present disclosure.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 608. The RAM 903 also stores various programs and data required by operations of the system 900. The CPU 901, the ROM 902 and the RAM 903 are connected to each other through a bus 904. An input/output (I/O) interface 605 is also connected to the bus 904.

The following components are connected to the I/O interface 905: a storage portion 906 including a hard disk and the like; and a communication portion 907 including a network interface card, such as a LAN card and a modem. The communication portion 907 performs communication processes via a network, such as the Internet. A driver 908 is also connected to the I/O interface 905 as required. A removable medium 909, such as a magnetic disk, an optical disk, a magneto-optical disk, and a semiconductor memory, may be installed on the driver908, to facilitate the retrieval of a computer program from the removable medium 611, and the installation thereof on the storage portion 906 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 907, and/or may be installed from the removable medium 909. The computer program, when executed by the central processing unit (CPU) 901, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

Computer program code for performing the operations of the present application may be written in one or more programming languages or a combination thereof, the programming languages including object oriented programming languages such as Smalltalk, and C++, as well as conventional procedural programming languages such as the "C" language or similar programming languages. The program code may execute entirely on the user's computer, partly on the user's computer, as a stand-alone software package, partly on the user's computer and partly on a remote computer, or entirely on a remote computer or server. In the case of a remote computer, the remote computer may be connected to the user computer through any kind of network, including a local area network (LAN) or a wide area network (WAN), or may be connected to an external computer (e.g., using an Internet service provider to connect via the Internet).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a determination unit, a generation unit, a transmitting unit, a receiving unit and a rendering unit. Here, the names of these units do not in some cases constitute a limitation to such units themselves. For example, the determination unit may also be described as "a unit for determining a search word set for indicating a to-be-detected point of interest."

In another aspect, the present disclosure further provides a computer readable medium. The computer readable medium may be included in the electronic device in the above described embodiments, or a stand-alone computer readable medium not assembled into the electronic device. The computer readable medium carries one or more programs. The one or more programs, when executed by the electronic device, cause the electronic device to: determine a search word set for indicating a to-be-detected point of interest; perform a search by using a determined search word as a search keyword, to obtain a description information set for describing the to-be-detected point of interest; and input a name of the to-be-detected point of interest and description information in the description information set into a pre-established validity discriminant model, to obtain a status label for indicating validity of the to-be-detected point of interest.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:
1. An Internet text mining-based method for judging validity of a point of interest (POI), comprising:
   determining a search word set for indicating a to-be-detected POI;
   performing a search by using a determined search word as a search keyword, to obtain a description information set for describing the to-be-detected POI; and
   inputting a name of the to-be-detected POI and description tion information in the description information set into a pre-established validity discriminant model, to obtain a status label for indicating validity of the to-be-detected POI, wherein the pre-established validity discriminant model is an attention model, the attention model comprises a semantic recognition sub-model and a feature extraction sub-model; and the validity discriminant model is trained and obtained by following training:

training an initial attention model by using a name of a sample POI and description information of the sample POI as inputs, and using a status label of the sample POI as a target, to obtain the validity discriminant model, wherein the semantic recognition sub-model is configured to extract semantic features of the name of the sample POI and a piece of description information of the sample POI input into the semantic recognition sub-model to obtain a semantic feature vector; and the feature extraction sub-model is configured to perform feature extraction from the name of the sample POI and the piece of description information of the sample POI according to one or several preset rules, to obtain a description feature vector for characterizing the piece of description information of the sample POI.

2. The method according to claim 1, wherein the determining a search word set for indicating a to-be-detected POI comprises:

using the name of the to-be-detected POI and a synonym of the name of the to-be-detected POI as search words in the search word set.

3. The method according to claim 1, wherein the training further comprises:

for one of sample points of interest, inputting a name of the sample POI and one piece of description information of the sample POI into the semantic recognition sub-model, inputting the piece of description information into the feature extraction sub-model, and splicing feature vectors output by the semantic recognition sub-model and the feature extraction sub-model to obtain a feature vector of the piece of description information for describing the sample POI;

determining a weighted sum of the feature vectors of respective description information of the sample POI;

determining, based on the weighted sum, a probability value belonging to the status label of the sample POI; and determining, based on a preset loss function, loss values of probability values of respective sample points of interest under the ground truths thereof, and propagating the determined loss values back in the attention model to adjust a model parameter of the attention model, so as to obtain the validity discriminant model.

4. The method according to claim 1, wherein the description information of the sample POI is obtained by:

determining a first synonym set consisting of the name of the sample POI and a synonym of the name of the sample POI;

determining a second synonym set consisting of the status label of the sample POI and a synonym of the status label of the sample POI; and performing a search by using a first synonym determined from the first synonym set and a second synonym determined from the second synonym set as a search word, and in the search results, using a statement in which the first synonym and the second synonym appear together as the description information of the sample POI.

5. The method according to claim 4, wherein the synonym of the status label of the sample POI is determined based on at least one of the following:

determining the synonym of the status label of the sample POI from a preset synonym database; or determining a preset number of target search statements from historical search statements comprising the name of the sample POI, and using a word determined from the determined target search statements and having a semantic similarity to the status label of the sample POI exceeding a preset similarity threshold as a synonym of the status label of the sample POI.

6. The method according to claim 2, wherein the synonym of the name of the POI is determined based on at least one of the following:

determining the synonym of the name of the POI from a preset encyclopedia database;

performing a search by using the name of the POI as a search word, and using a matching entity obtained by the search as a synonym of the name of the POI, wherein the matching entity is an entity, the ratio of a longest common substring between the name of the POI and the name of the entity to the name of the entity exceeding a preset ratio threshold, among the entities included in a preset number of search results; or performing a search by using the name of the POI as a search word, extracting statements comprising the name of the sample POI from a preset number of search results, and determining from the extracted statements, by using a co-reference resolution tool, a word for indicating the name of the POI as a synonym;

wherein the POI is one of the to-be-detected POI and the sample POI.

7. The method according to claim 4, wherein the synonym of the name of the POI is determined based on at least one of the following:

determining the synonym of the name of the POI from a preset encyclopedia database;

performing a search by using the name of the POI as a search word, and using a matching entity obtained by the search as a synonym of the name of the POI, wherein the matching entity is an entity, the ratio of a longest common substring between the name of the POI and the name of the entity to the name of the entity exceeding a preset ratio threshold, among the entities included in a preset number of search results; or performing a search by using the name of the POI as a search word, extracting statements comprising the name of the sample POI from a preset number of search results, and determining from the extracted statements, by using a co-reference resolution tool, a word for indicating the name of the POI as a synonym;

wherein the POI is one of the to-be-detected POI and the sample POI.

8. An Internet text mining-based apparatus for judging validity of a point of interest (POI), comprising:

at least one processor; and a memory storing instructions, the instructions when executed by the at least one processor, cause the at least one processor to perform operations, the operations comprising:

determining a search word set for indicating a to-be-detected POI;

performing a search by using a determined search word as a search keyword, to obtain a description information set for describing the to-be-detected POI; and inputting a name of to-be-detected POI and the description information in the description information set into a pre-established validity discriminant model, to obtain a status label for indicating validity of the to-be-detected POI, wherein the pre-established validity discriminant model is an attention model, and the attention model comprises a semantic recognition sub-model and a feature extraction sub-model; and the validity discriminant model is trained and obtained by following training:

training an initial attention model by using a name of a sample POI and description information of the sample POI as inputs, and using a status label of the sample POI as a target, to obtain the validity discriminant model, wherein the semantic recognition sub-model is configured to extract semantic features of the name of the sample POI and a piece of description information of the sample POI input into the semantic recognition sub-model to obtain a semantic feature vector; and the feature extraction sub-model is configured to perform feature extraction from the name of the sample POI and the piece of description information of the sample POI according to one or several preset rules, to obtain a description feature vector for characterizing the piece of description information of the sample POI.

9. The apparatus according to claim 8, wherein the determining a search word set for indicating a to-be-detected POI comprises:

using the name of the to-be-detected POI and a synonym of the name of the to-be-detected POI as search words in the search word set.

10. The apparatus according to claim 8, wherein the training further comprises:

for one of sample points of interest, inputting a name of the sample POI and one piece of description information of the sample POI into the semantic recognition sub-model, inputting the piece of description information into the feature extraction sub-model, and splicing feature vectors output by the semantic recognition sub-model and the feature extraction sub-model to obtain a feature vector of the piece of description information for describing the sample POI;

determining a weighted sum of the feature vectors of respective description information of the sample POI;

determining, based on the weighted sum, a probability value belonging to the status label of the sample POI; and determining, based on a preset loss function, loss values of probability values of respective sample points of interest under the ground truths thereof, and propagating the determined loss values back in the attention model to adjust a model parameter of the attention model, so as to obtain the validity discriminant model.

11. The apparatus according to claim 8, wherein the description information of the sample POI is obtained by:

determining a first synonym set consisting of the name of the sample POI and a synonym of the name of the sample POI;

determining a second synonym set consisting of the status label of the sample POI and a synonym of the status label of the sample POI; and performing a search by using a first synonym determined from the first synonym set and a second synonym determined from the second synonym set as a search word, and in the search results, using a statement in which the first synonym and the second synonym appear together as the description information of the sample POI.

12. The apparatus according to claim 11, wherein the synonym of the status label of the sample POI is determined based on at least one of the following:

determining the synonym of the status label of the sample POI from a preset synonym database; or determining a preset number of target search statements from historical search statements comprising the name of the sample POI, and using a word determined from the determined target search statements and having a semantic similarity to the status label of the sample POI exceeding a preset similarity threshold as a synonym of the status label of the sample POI.

13. The apparatus according to claim 9, wherein the synonym of the name of the POI is determined based on at least one of the following:

determining the synonym of the name of the POI from a preset encyclopedia database;

performing a search by using the name of the POI as a search word, and using a matching entity obtained by the search as a synonym of the name of the POI, wherein the matching entity is an entity, the ratio of the longest common sub string between the name of the POI and the name of the entity to the name of the entity exceeding a preset ratio threshold, among the entities included in a preset number of search results; or performing a search by using the name of the POI as a search word, extracting statements comprising the name of the sample POI from a preset number of search results, and determining from the extracted statements, by using a co-reference resolution tool, a word for indicating the name of the POI as a synonym;

wherein the POI is one of the to-be-detected POI and the sample POI.

14. The apparatus according to claim 11, wherein the synonym of the name of the POI is determined based on at least one of the following:

determining the synonym of the name of the POI from a preset encyclopedia database;

performing a search by using the name of the POI as a search word, and using a matching entity obtained by the search as a synonym of the name of the POI, wherein the matching entity is an entity, the ratio of the longest common sub string between the name of the POI and the name of the entity to the name of the entity exceeding a preset ratio threshold, among the entities included in a preset number of search results; or performing a search by using the name of the POI as a search word, extracting statements comprising the name of the sample POI from a preset number of search results, and determining from the extracted statements, by using a co-reference resolution tool, a word for indicating the name of the POI as a synonym;

wherein the POI is one of the to-be-detected POI and the sample POI.

15. A non-transitory computer readable storage medium storing a computer program, wherein the computer program, when executed by a processor, causes the processor to perform operations, the operations comprising:

determining a search word set for indicating a to-be-detected POI;

performing a search by using a determined search word as a search keyword, to obtain a description information set for describing the to-be-detected POI; and inputting a name of the to-be-detected POI and description information in the description information set into a pre-established validity discriminant model, to obtain a status label for indicating validity of the to-be-detected POI, wherein the pre-established validity discriminant model is an attention model, and the attention model comprises a semantic recognition sub-model and a feature extraction sub-model; and the validity discriminant model is trained and obtained by following training:

training an initial attention model by using a name of a sample POI and description information of the sample POI as inputs, and using a status label of the sample POI as a target, to obtain the validity discriminant model, wherein the semantic recognition sub-model is configured to extract semantic features of the name of the sample POI and a piece of description information of the sample POI input into the semantic recognition sub-model to obtain a semantic feature vector; and the feature extraction sub-model is configured to perform feature extraction from the name of the sample POI and the piece of description information of the sample POI according to one or several preset rules, to obtain a description feature vector for characterizing the piece of description information of the sample POI.

16. The medium according to claim 15, wherein the determining a search word set for indicating a to-be-detected POI comprises:

using the name of the to-be-detected POI and a synonym of the name of the to-be-detected POI as search words in the search word set.

17. The medium according to claim 15, wherein the training further comprises:

for one of sample points of interest, inputting a name of the sample POI and one piece of description information of the sample POI into the semantic recognition sub-model, inputting the piece of description information into the feature extraction sub-model, and splicing feature vectors output by the semantic recognition sub-model and the feature extraction sub-model to obtain a feature vector of the piece of description information for describing the sample POI;

determining a weighted sum of the feature vectors of respective description information of the sample POI;

determining, based on the weighted sum, a probability value belonging to the status label of the sample POI; and determining, based on a preset loss function, loss values of probability values of respective sample points of interest under the ground truths thereof, and propagating the determined loss values back in the attention model to adjust a model parameter of the attention model, so as to obtain the validity discriminant model.

* * * * *